United States Patent
Ichikawa

(10) Patent No.: US 10,035,248 B2
(45) Date of Patent: Jul. 31, 2018

(54) CHAIN TOOL

(71) Applicant: BIB CREATIVE CO., LTD., Taichung (TW)

(72) Inventor: Tomonari Ichikawa, Nishinomiya (JP)

(73) Assignee: BIB CREATIVE CO., LTD., Taichung (TW)

( * ) Notice: Subject to any disclaimer, the term of this patent is extended or adjusted under 35 U.S.C. 154(b) by 0 days.

(21) Appl. No.: 15/722,125

(22) Filed: Oct. 2, 2017

(65) Prior Publication Data

US 2018/0093369 A1   Apr. 5, 2018

(30) Foreign Application Priority Data

Oct. 5, 2016 (TW) .............................. 105215140 U
Jun. 7, 2017 (TW) .............................. 106208150 U

(51) Int. Cl.

| B21L 21/00 | (2006.01) |
|---|---|
| B25B 27/22 | (2006.01) |
| B62M 9/16 | (2006.01) |
| B25B 27/00 | (2006.01) |

(52) U.S. Cl.
CPC .......... B25B 27/22 (2013.01); B25B 27/0071 (2013.01); B62M 9/16 (2013.01)

(58) Field of Classification Search
CPC ..... B25B 27/22; B25B 27/0071; B25B 13/00; B62M 9/16; B21L 21/00

USPC .............................................................. 59/7
See application file for complete search history.

(56) References Cited

U.S. PATENT DOCUMENTS

| 2,444,450 | A | * | 7/1948 | Kellgren | ................. B25B 27/22 59/7 |
|---|---|---|---|---|---|
| 2,467,279 | A | * | 4/1949 | Vaupel | ..................... B25B 27/22 59/7 |
| 6,112,351 | A | * | 9/2000 | Hawkins | ............. B25B 27/0071 7/118 |
| 7,343,728 | B1 | * | 3/2008 | Cundari | .................. B21L 21/00 59/35.1 |

* cited by examiner

Primary Examiner — David B Jones
(74) Attorney, Agent, or Firm — Alan D. Kamrath; Kamrath IP Lawfirm, P.A.

(57) ABSTRACT

A chain tool has two members each having a first edge formed with an opening to be engaged with the opening of the other member so that the two members can be pivoted with respect to each other. Each member has an opposite second edge provided with a recess and also has a guide groove in communication with the recess and the corresponding opening, wherein the recess is lightly deeper than the guide groove. Each member further has a rib extending along the corresponding first edge and projecting into the corresponding opening to form a protruding portion. When the openings of the two members are brought into engagement, the protruding portion of each member is moved along the guide groove of the other member into engagement in the recess of the other member.

7 Claims, 22 Drawing Sheets

CHAIN TOOL

BACKGROUND OF THE INVENTION

1. Technical Field

The present invention relates to the structure of a hand tool for connecting and disconnecting a chain. More particularly, the invention relates to a chain tool that is both portable and easy to use.

2. Description of Related Art

FIG. 21 shows a conventional chain 9 with rapidly connectable and disconnectable end links. The two end links of the chain 9 are provided with two outer plates 91 on two opposite sides of the chain 9 respectively. Each outer plate 91 has a pin 92 and a through hole 93, wherein the through hole 93 has a large-diameter section 931 and a small-diameter section 932.

To connect the two end links of the chain 9 with the two outer plates 91, the pin 92 of each outer plate 91 is placed into the large-diameter section 931 of the through hole 93 of the other outer plate 91 through the corresponding hole in the corresponding end link. Then, the two end links are pulled in opposite directions so that the rollers 95 corresponding respectively to the pins 92 are moved away from each other to displace each pin 92 from the corresponding large-diameter section 931 to the corresponding small-diameter section 932 and to secure each pin 92 in position, thereby completing the connection of the two end links of the chain 9.

When it is desired to separate the two end links of the chain 9, referring to FIG. 22, the rollers 95 of the two end links that correspond respectively to the pins 92 of the outer plates 91 are simultaneously gripped with a pair of pliers 96 and are brought close to each other by applying a force to the pliers 96. Once displaced from the corresponding small-diameter section 932 to the corresponding large-diameter section 931, each pin 92 can be removed from the corresponding large-diameter section 931 to separate the two end links of the chain 9.

In bicycle riding, however, a rider would generally desire to carry as little load as possible during cycling; hence it is practically impossible for a cyclist to carry with them a large number of tools or a bulky tool like pliers. In view of this, the inventor of the present invention designed a "chain tool" as an improvement over its prior art counterparts. This chain tool is composed of two plate-shaped members that can be pivotally connected in a crossed configuration. Each plate-shaped member includes a first end and a second end opposite the first end, wherein the first end is provided with a hook portion to be inserted into a link of a chain. In addition, there is an opening between the first end and the second end of each plate-shaped member, and the opening of each plate-shaped member is configured to engage with the opening of the other plate-shaped member so that the two plate-shaped members can be pivoted with respect to each other about an axis defined by the engaged portion of the openings, in order to remove a quick link. While this chain tool is advantageously compact and portable, it leaves something to be desired in use. More specifically, the two plate-shaped members are engaged with each other via the openings only, without any securing structure between the openings; as a result, the two plate-shaped members tend to separate from each other in the assembled (i.e., engaged) state, which is disadvantageous to single-handed operation.

BRIEF SUMMARY OF THE INVENTION

The primary objective of the present invention is to provide a portable chain tool that can be operated single-handedly.

To achieve the above objective, the chain tool of the present invention has two members configured for pivotal connection in a crossed manner. Each member includes a first end and a second end opposite the first end, wherein the first end is provided with a hook portion to be inserted in between a pair of quick link plates of a chain. Each member has a first edge formed with an opening to be engaged with the opening of the other member so that the two members can be pivoted with respect to each other about an axis defined by the engaged portions of the openings. The chain tool is characterized in that:

Each member has a second edge opposite its first edge and concavely provided with a recess spaced apart from the corresponding opening. Moreover, each member is transversely and concavely provided with a guide groove between and in communication with the corresponding opening and the corresponding recess, wherein the corresponding recess is slightly deeper than the guide groove. The first edge of each member is further provided with a rib extending along the first edge and projecting into the corresponding opening to form a protruding portion. When the openings of the two members are brought into engagement with each other, the protruding portion of each member is moved along the guide groove of the other member and becomes engaged in the recess of the other member.

DETAILED DESCRIPTION OF THE INVENTION

Figure 1:
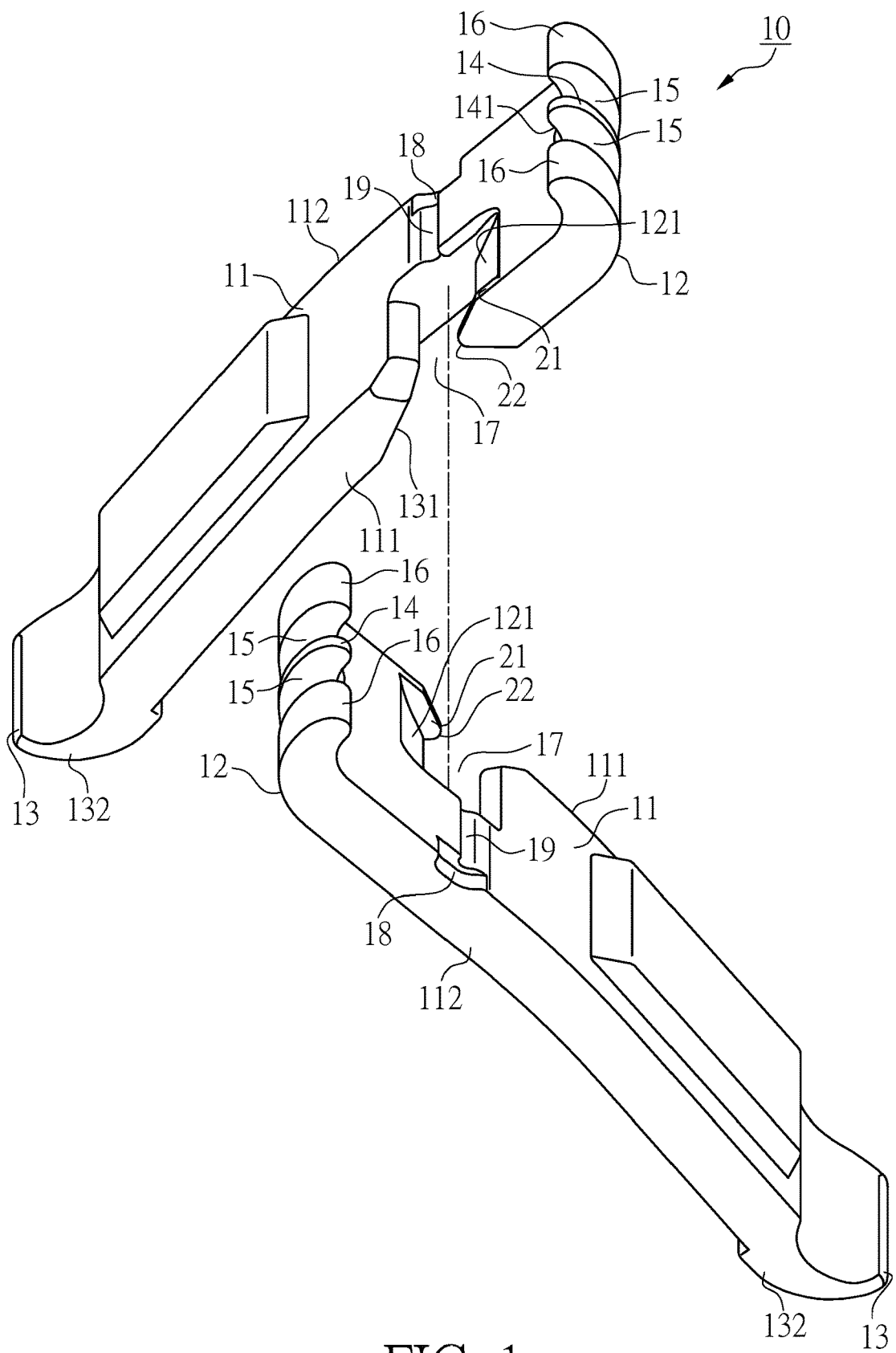
FIG. 1 is an exploded perspective view of the first embodiment of the present invention.
Figure 2:
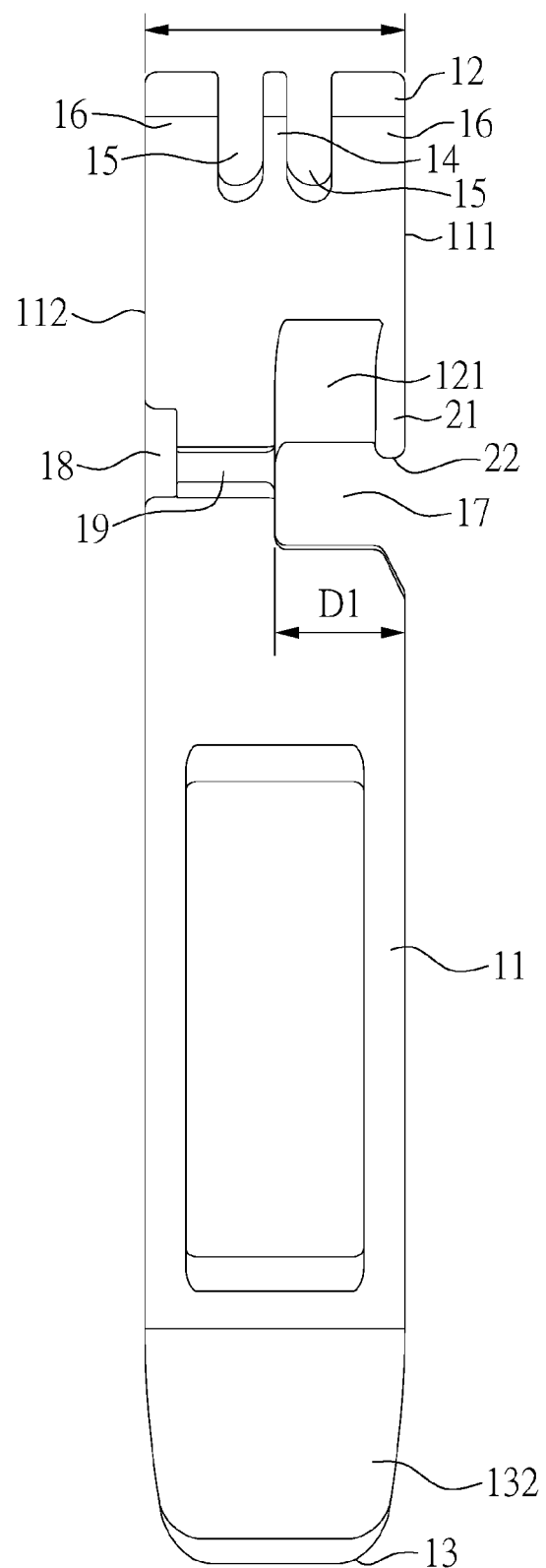
FIG. 2 is a top view of a member in the first embodiment.
Figure 3:
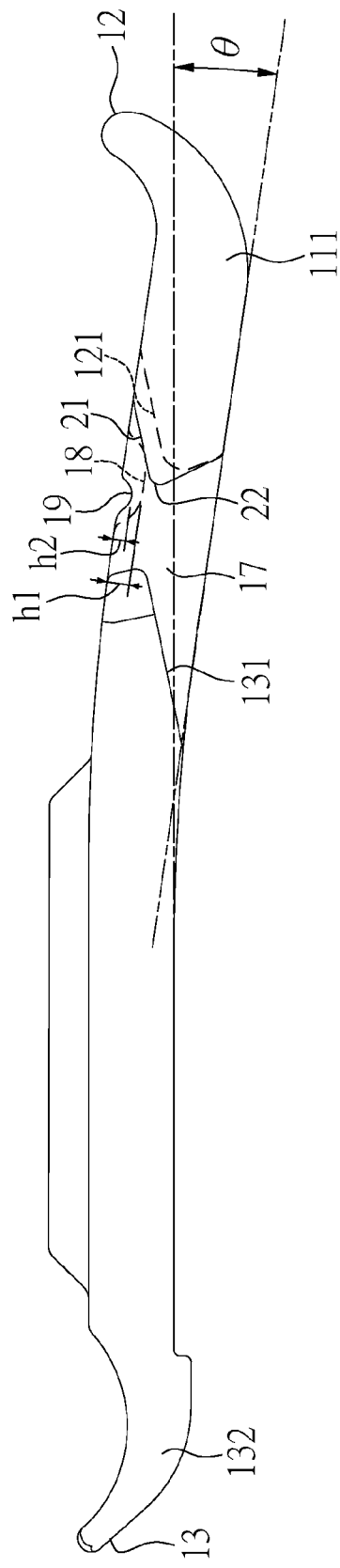
FIG. 3 is a side view of the member in FIG. 2.

Referring to FIG. 1 to FIG. 3, the present invention provides a chain tool 10 composed essentially of two members 11 that can be pivotally connected in a crossed configuration rapidly.

The two members 11 are both plate-shaped and each include a first end 12 and a second end 13 opposite the first end 12. The first end 12 of each member 11 is provided with a hook portion 14 to be inserted in between a pair of quick link plates of a chain (not shown), wherein the hook portion 14 is curved toward one side of the member 11 and is formed with an operating surface 141 to be pressed against a roller between the pair of quick link plates. In this embodiment, the first end 12 of each member 11 is preferably formed with two parallel spaced-apart grooves 15 such that the corresponding hook portion 14 is formed between the two grooves 15. The first end 12 of each member 11 is preferably also formed with an auxiliary hook portion 16 on each of two lateral sides of the corresponding hook portion 14, wherein the two auxiliary hook portions 16 are curved in the same direction as the corresponding hook portion 14.

Each member 11 has a first edge 111 and a second edge 112 opposite the first edge 111. The first edge 111 of each member 11 is formed with an opening 17 that is in communication with the outside and that can be engaged with the opening 17 of the other member 11 so that the two members 11 can be pivoted with respect to each other in a crossed configuration about an axis defined by the engaged portions of the openings 17. The second edge 112 of each member 11 is concavely provided with a recess 18 spaced apart from the corresponding opening 17. Moreover, each member 11 is transversely and concavely provided with a guide groove 19 that lies between and is in communication with the corresponding opening 17 and the corresponding recess 18 and that is perpendicularly connected to the corresponding recess 18. The depth h1 of each recess 18 is slightly larger than the depth h2 of each guide groove 19. The first edge 111 of each member 11 is further provided with a rib 21 extending along the first edge 111 and projecting into the corresponding opening 17 to form a protruding portion 22. Each protruding portion 22 protrudes into the corresponding opening 17 for a distance approximately equal to the depth h1 of each recess 18. When the openings 17 of the two members 11 are brought into engagement with each other, the protruding portion 22 of each member 11 is moved along the guide groove 19 of the other member 11 into the recess 18 of the other member 11 and becomes engaged in the recess 18.

In this embodiment, referring to FIG. 2, each member 11 has a width D defined as the distance between its first edge 111 and second edge 112, and each opening 17 preferably has a width D1 approximately equal to one half of the width D. Referring also to FIG. 3, the first end 12 of each member 11 has an end surface adjacent to one side of the corresponding opening 17 and formed with a first inclined guide surface 121, and the second end 13 of each member 11 has an end surface adjacent to the opposite side of the corresponding opening 17 and formed with a second inclined guide surface 131. The first inclined guide surface 121 and the second inclined guide surface 131 of each member 11 are inclined, and extend, in the same direction. The second end 13 of each member 11 is further extended with a scoop-like prying portion 132 so that the members 11, or more particularly the prying portions 132 at their respective second ends 13, can double as tire levers. To use either member 11 as a tire lever, the opening 17 of the member 11 is engaged with a spoke of a wheel (not shown), with the first inclined guide surface 121 and the second inclined guide surface 131 pressed against the spoke.

As shown in FIG. 3, the direction in which the second end 13 of the member 11 extends defines a horizontal reference plane. The direction in which the first end 12 extends is inclined downward with respect to the second end 13 and forms an included angle θ, about 8 degrees in this embodiment, with the second end 13 so that, when the openings 17 of the two members 11 are engaged with each other, the angle between the second ends 13 of the two members 11 and the angle between the first ends 12 of the two members 11 make it easier for a user to hold and operate the chain tool 10 with a single hand.

Figure 4:
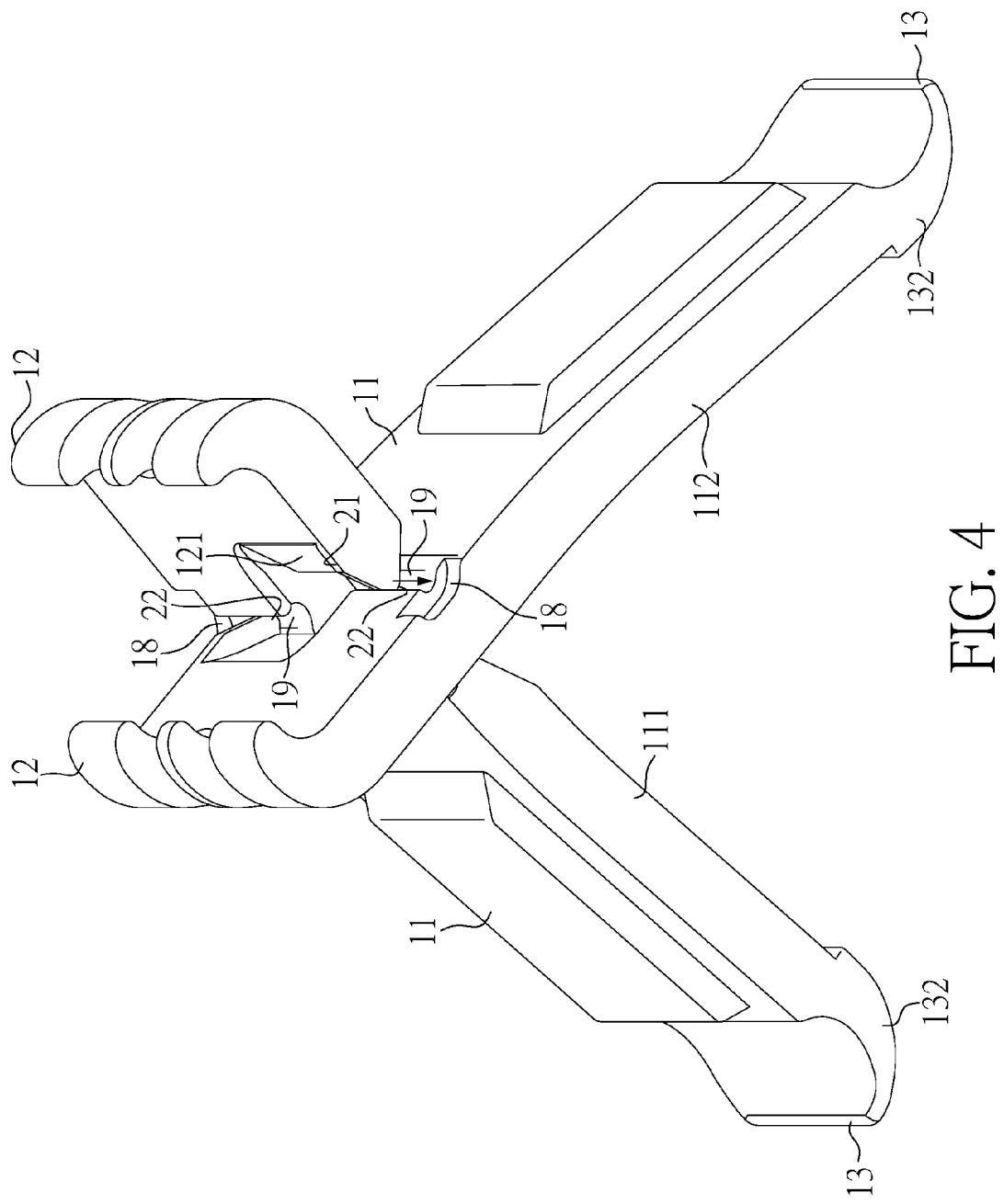
FIG. 4 is a perspective view showing the assembly process of the first embodiment, in particular how the protruding portion of each member slides along the guide groove of the other member.
Figure 5:
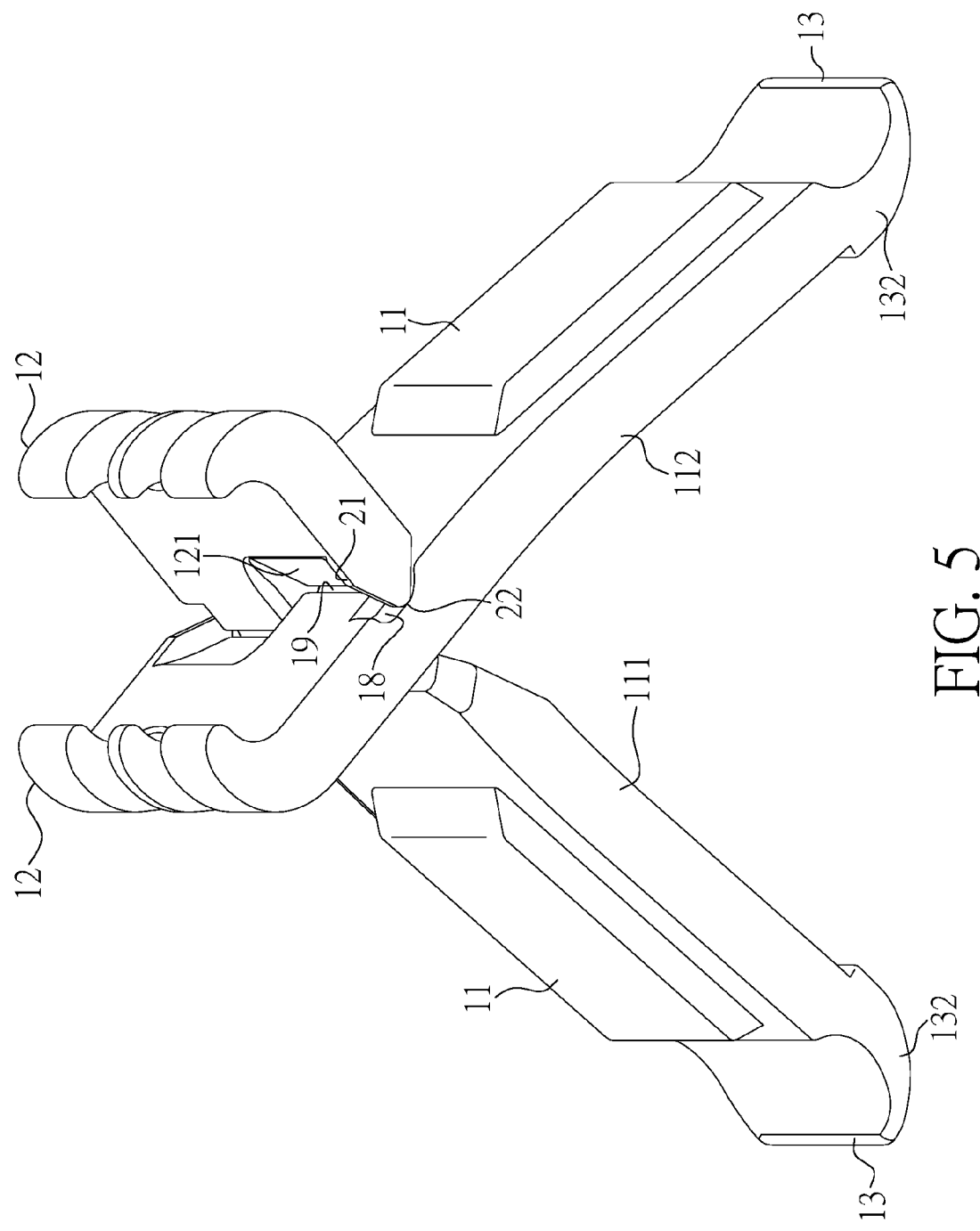
FIG. 5 is an assembled perspective view of the first embodiment, showing in particular that the protruding portion of each member is engaged in the recess of the other member.

To assemble the chain tool 10, referring to FIG. 4 and FIG. 5, the first step is to bring the two members 11 close to each other, with the two openings 17 facing each other and ready for engagement. Next, the protruding portion 22 of each member 11 is slid along the guide groove 19 of the other member 11 into the recess 18 of the other member 11, allowing the weight of each member 11 to drive the corresponding protruding portion 22 into engagement with the recess 18 of the other member 11; in other words, once the protruding portion 22 of each member 11 is slid into the recess 18 of the other member 11, the former will fall into the latter due to the weight of the former member 11. As a result, each protruding portion 22 is blocked by the inner wall of the recess 18 engaged therewith and is kept from lateral displacement, and assembly of the two members 11 is complete. The two members 11 can now be pivoted with respect to each other in a crossed configuration about an axis defined by the engaged portions of the openings 17. It should be pointed out that after the two members 11 are put together, the engagement between the protruding portion 22 of each member 11 and the recess 18 of the other member 11 helps secure the two members 11 to each other by way of interference, ensuring that the two members 11 are not readily separable from each other during operation. This technical feature facilitates single-handed operation and adds greatly to the usefulness of the chain tool 10 of the present invention.

Figure 6:
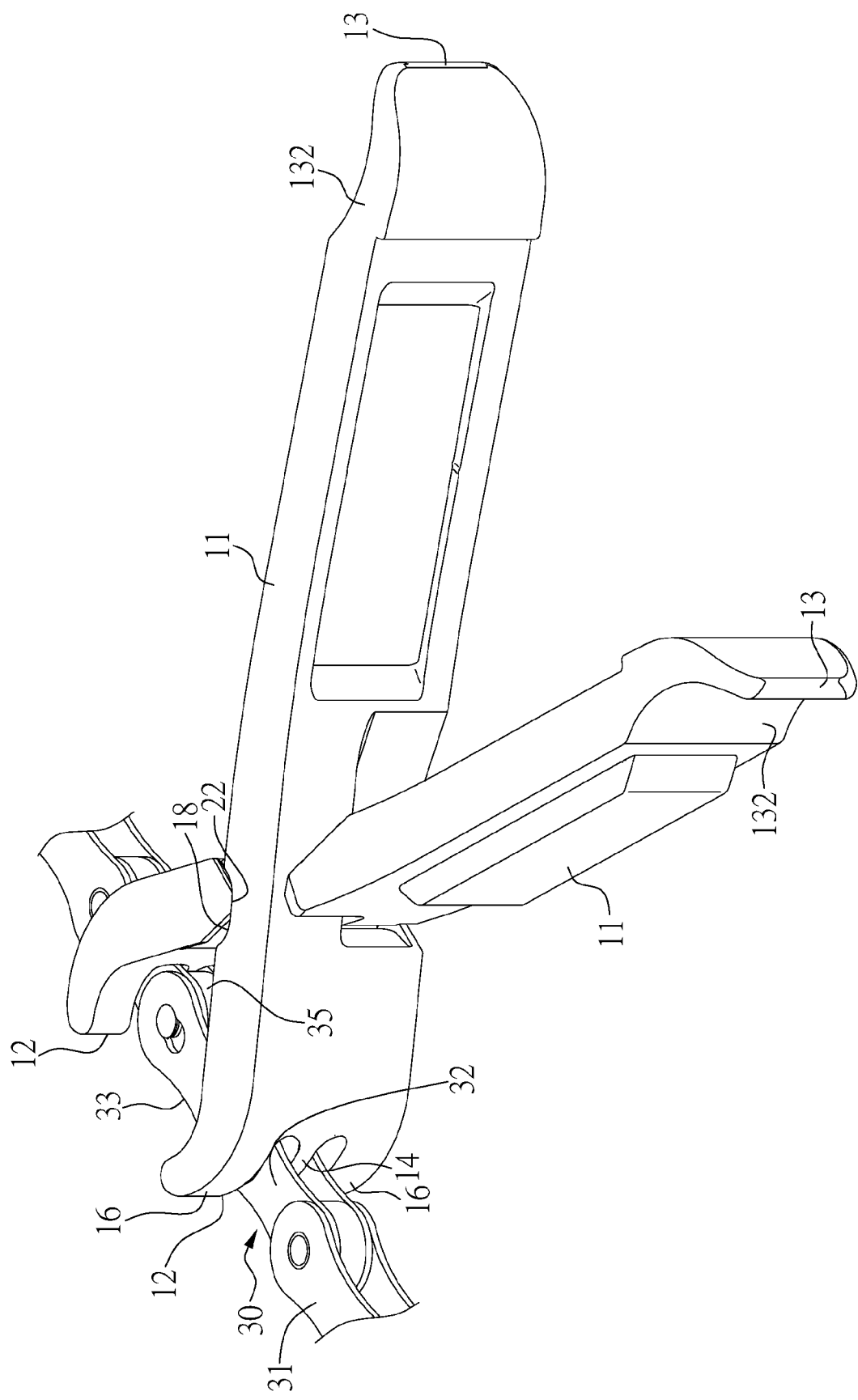
FIG. 6 is a perspective view showing how the first embodiment is used to disconnect a chain.
Figure 7:
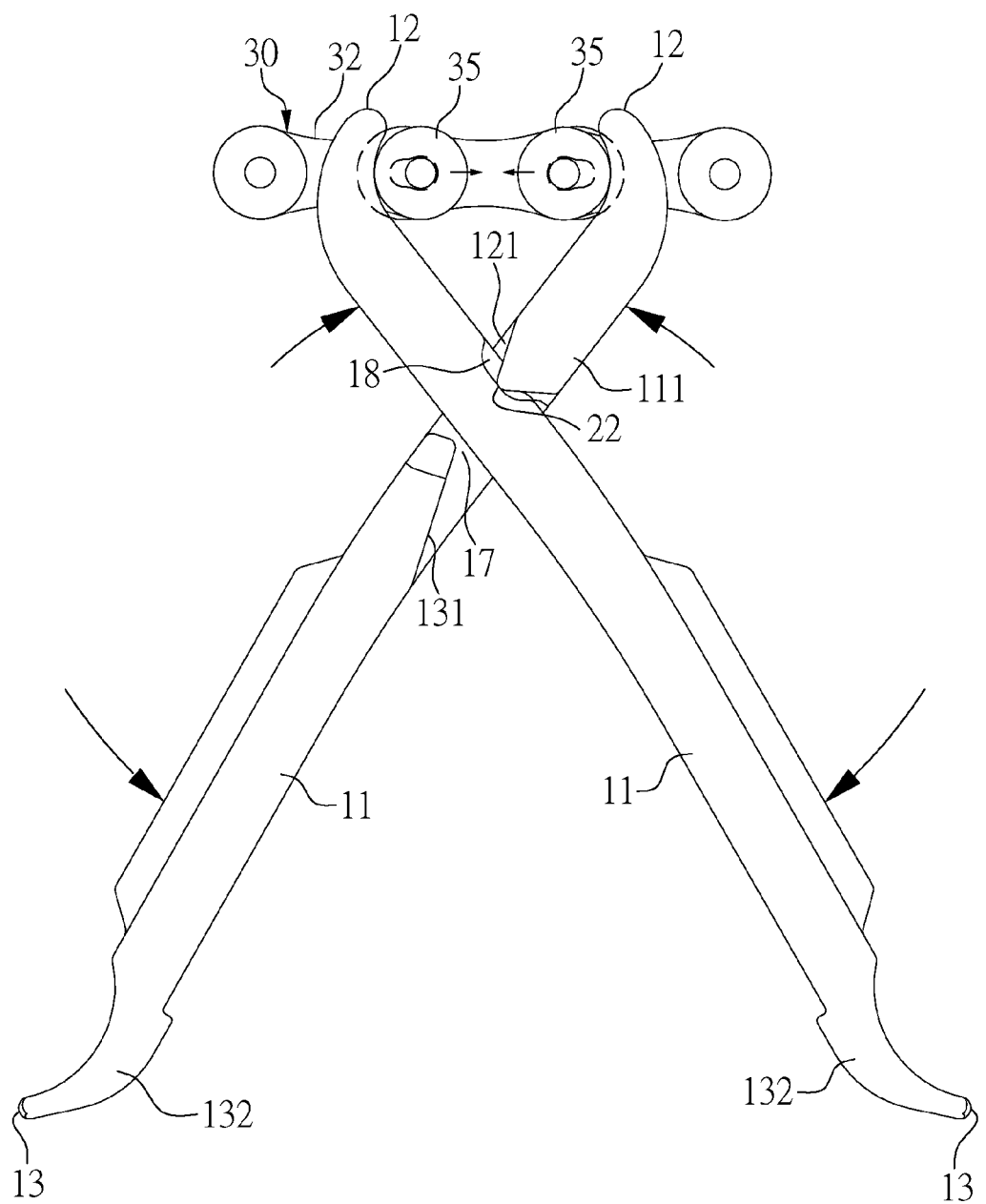
FIG. 7 is another view showing how the first embodiment is used to disconnect a chain.
Figure 8:
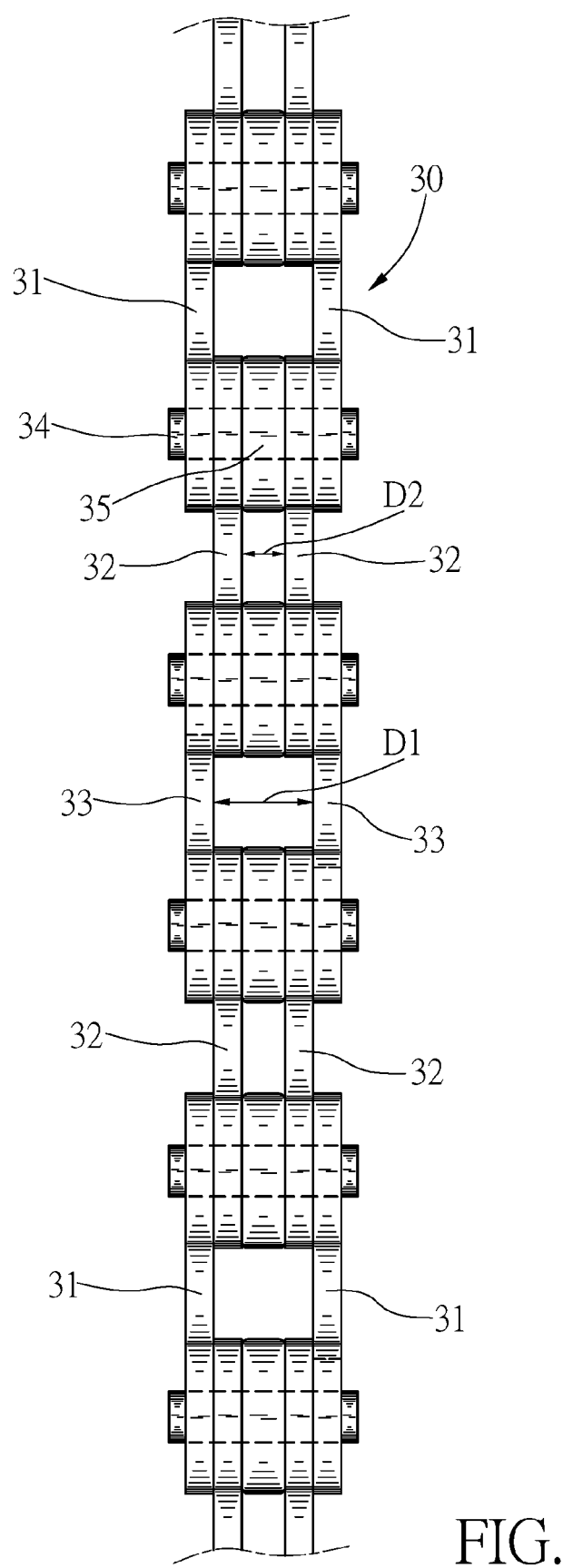
FIG. 8 is a partial view of a chain, to which each of the disclosed embodiments of the present invention is applied.

The procedure of removing a chain 30 with the chain tool 10 is detailed below with reference to FIG. 6 to FIG. 8. The chain 30 is composed of multiple pairs of outer plates 31, multiple pairs of inner plates 32, and a pair of quick link plates 33 sequentially connected by a plurality of pins 34, wherein each pin 34 is provided with a roller 35. The quick link plates 33 enable rapid connection and disconnection of the two end links of the chain 30. To remove the quick link plates 33, referring to FIG. 6 and FIG. 7, the hook portions 14 of the two mutually engaged, or pivotally connected, members 11 are placed respectively into the spaces flanking the two rollers 35 corresponding to the quick link plates 33, or more particularly the two spaces each formed between an adjacent pair of the inner plates 32 of the chain 30. Then, a force is applied to the second ends 13 of the two members 11 to move the second ends 13 toward each other. Consequently, the operating surfaces 141 of the hook portions 14 at the first ends 12 of the two members 11 are pivoted and, while being pressed against the two rollers 35 respectively, drive the rollers 35 close to each other so that the quick link plates 33 can be removed.

According to the above, the chain tool 10 can be easily assembled by pivotally connecting the plate-shaped members 11. When not in use, the two members 11 can be put away in a stacked configuration. Compared with pliers conventionally used to disconnect a chain, the chain tool 10 of the present invention has not only the advantages of spatial efficiency and portability, but also the function of securing the two members 11 together by interference therebetween, which function ensures that the two members 11 will not separate from each other easily during use. The chain tool 10 of the present invention is therefore ideal for single-handed operation and highly useful.

Figure 9:
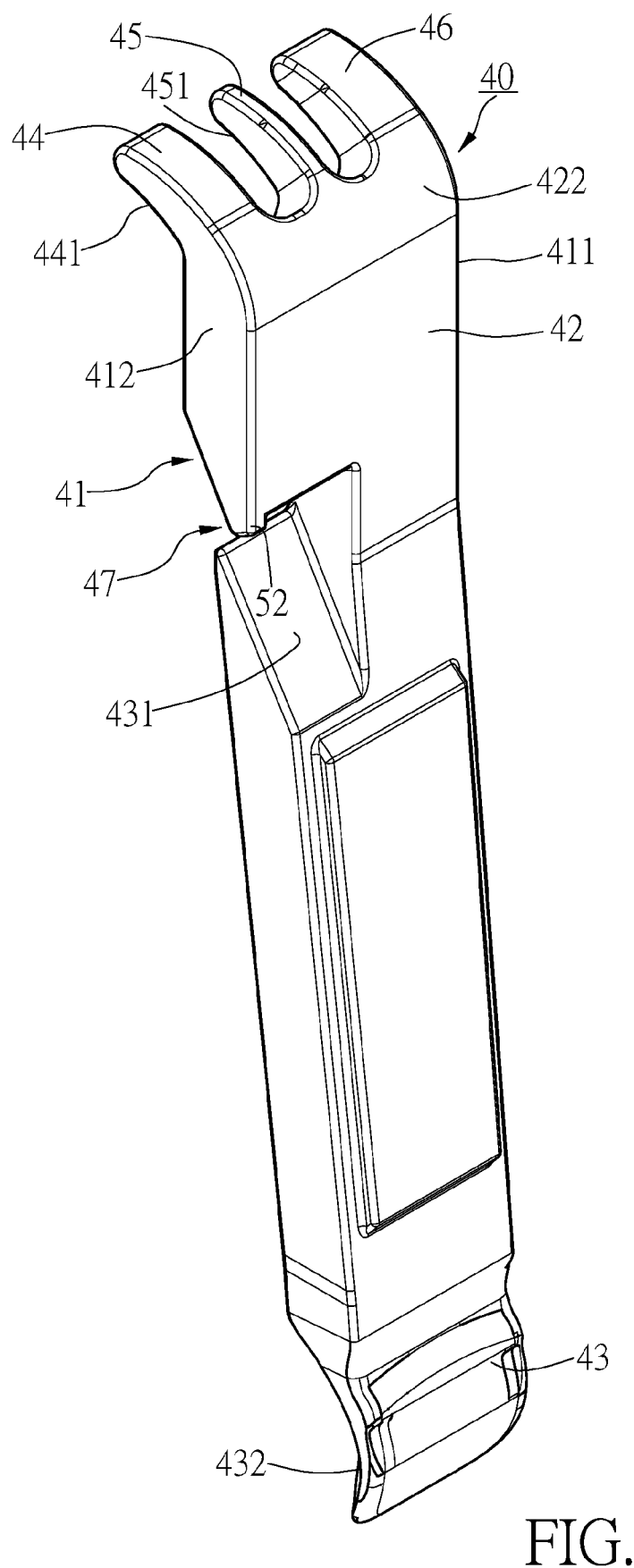
FIG. 9 is a perspective view of a member in the second embodiment of the present invention.
Figure 10:
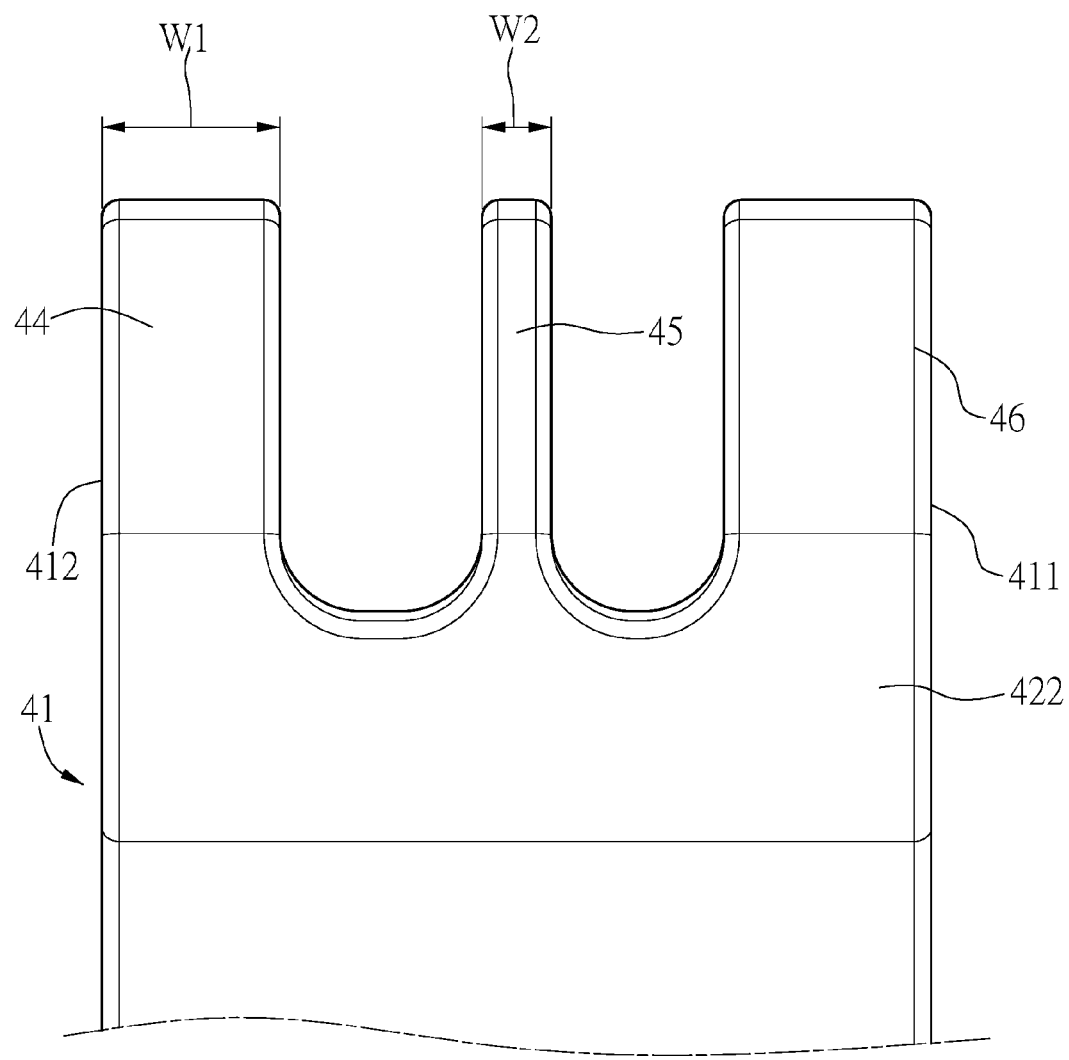
FIG. 10 is an enlarged view of the end of the member in FIG. 9 that has a plurality of hook portions.

FIG. 9 and FIG. 10 show the second embodiment of the present invention. The second embodiment is different from the first embodiment mainly in that each member 41 in the second embodiment has a plurality of hook portions at one end, in addition to an opening 47 for engagement with its counterpart in the other member 41. The hook portions of each member 41 are curved toward the same side from the end where they are located, forming claw-shaped structures. Meanwhile, the backside of the plural hook portions of each member 41 forms a curved surface 422. The plural hook portions of each member 41 include at least one first hook portion 44, which has a first width W1 approximately equal to a first distance D1 defined between the pair of quick link plates 33 (see FIG. 8) and can be placed in between the pair of quick link plates 33 and pressed against the corresponding roller 35, and a second hook portion 45, which has a second width W2 approximately equal to a second distance D2 defined between each pair of inner plates 32 (see FIG. 8, the second distance D2 being smaller than the first distance D1) and can be placed in between any pair of inner plates 32 and pressed against the corresponding roller 35. The first width W1 is larger than the second width W2.

As shown in FIG. 9 and FIG. 10, each member 41 in this embodiment has one first hook portion 44, one second hook portion 45, and an auxiliary hook portion 46 arranged alongside the first hook portion 44 and the second hook portion 45, wherein the auxiliary hook portion 46, located beside the second hook portion 45, helps secure in position the chain 30 to be connected.

Figure 11:
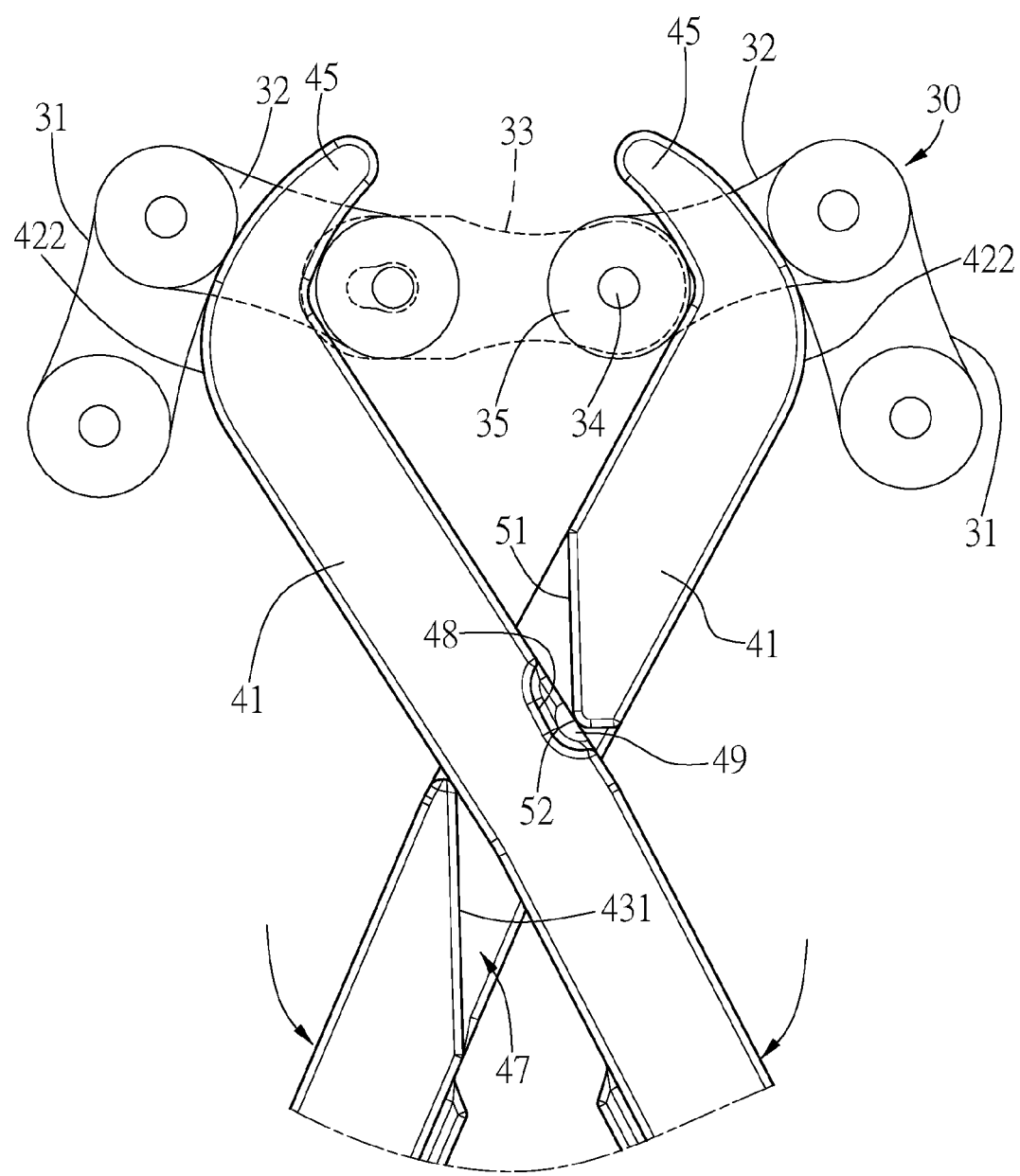
FIG. 11 shows how the two members in each disclosed embodiment of the present invention are used to disconnect a chain.

When the chain tool in the second embodiment is used to disconnect the chain 30, referring to FIG. 11, the two members 41 are brought close to each other, with the first hook portion 44 and the second hook portion 45 of each member 41 facing their counterparts of the other member 41. Next, the two members 41 are engaged with each other through the openings 47 so as to be pivoted with respect to each other. The second hook portion 45 of one member 41 is then placed into the space between the pair of inner plates 32 located on one outer side of the quick link plates 33 and is pressed against one of the two rollers 35 corresponding to the quick link plates 33. Similarly, the second hook portion 45 of the other member 41 is placed into the space between the pair of inner plates 32 located on the other outer side of the quick link plates 33 and is pressed against the other of the two rollers 35 corresponding to the quick link plates 33. After that, a force is applied to the two members 41 to bring close to each other the two rollers 35 against which the second hook portions 45 are respectively pressed, thereby allowing the chain 30 to be disconnected.

Figure 12:
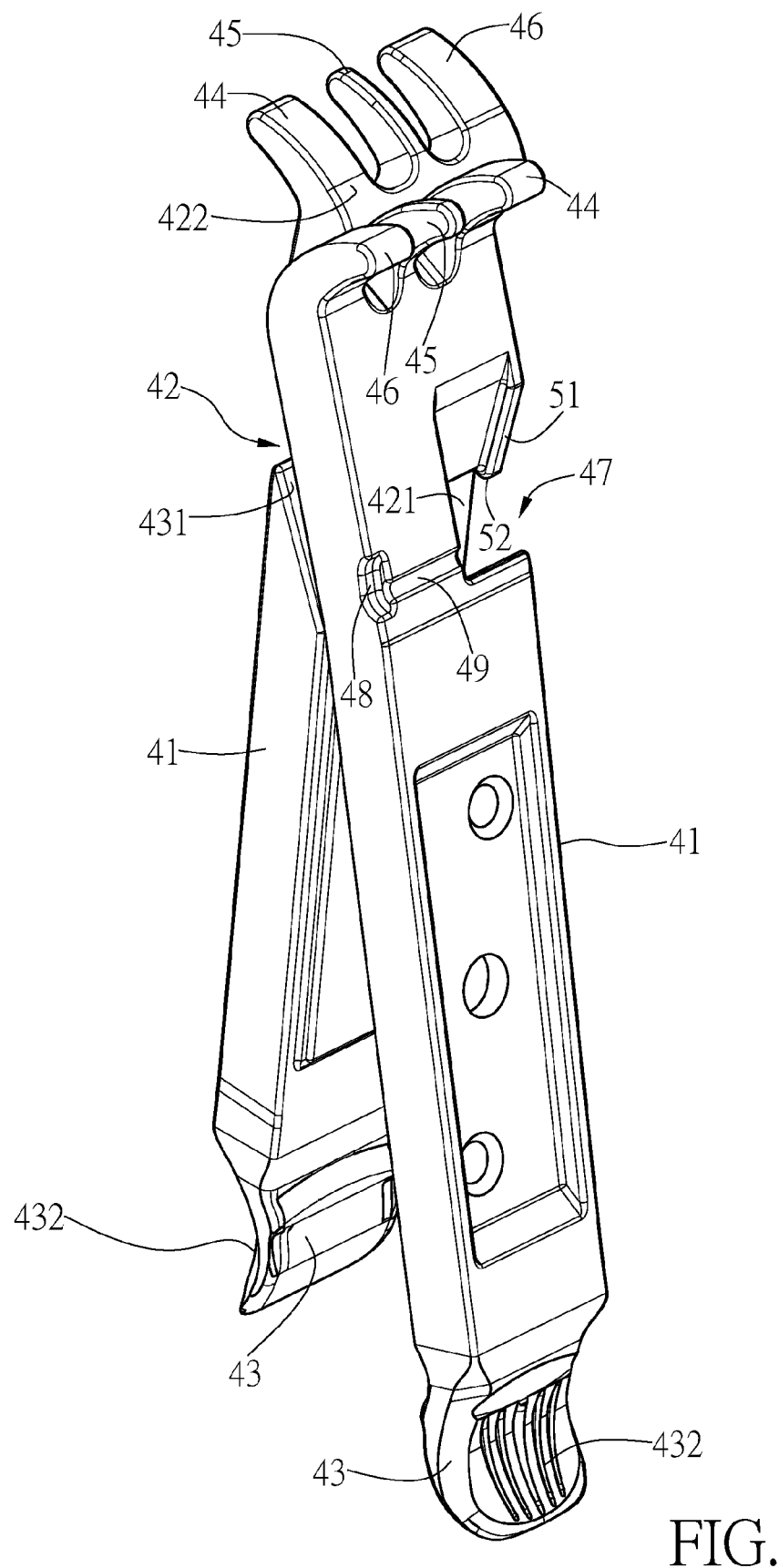
FIG. 12 shows how the two members in each disclosed embodiment of the present invention are used in an offset configuration to connect a chain.
Figure 13:
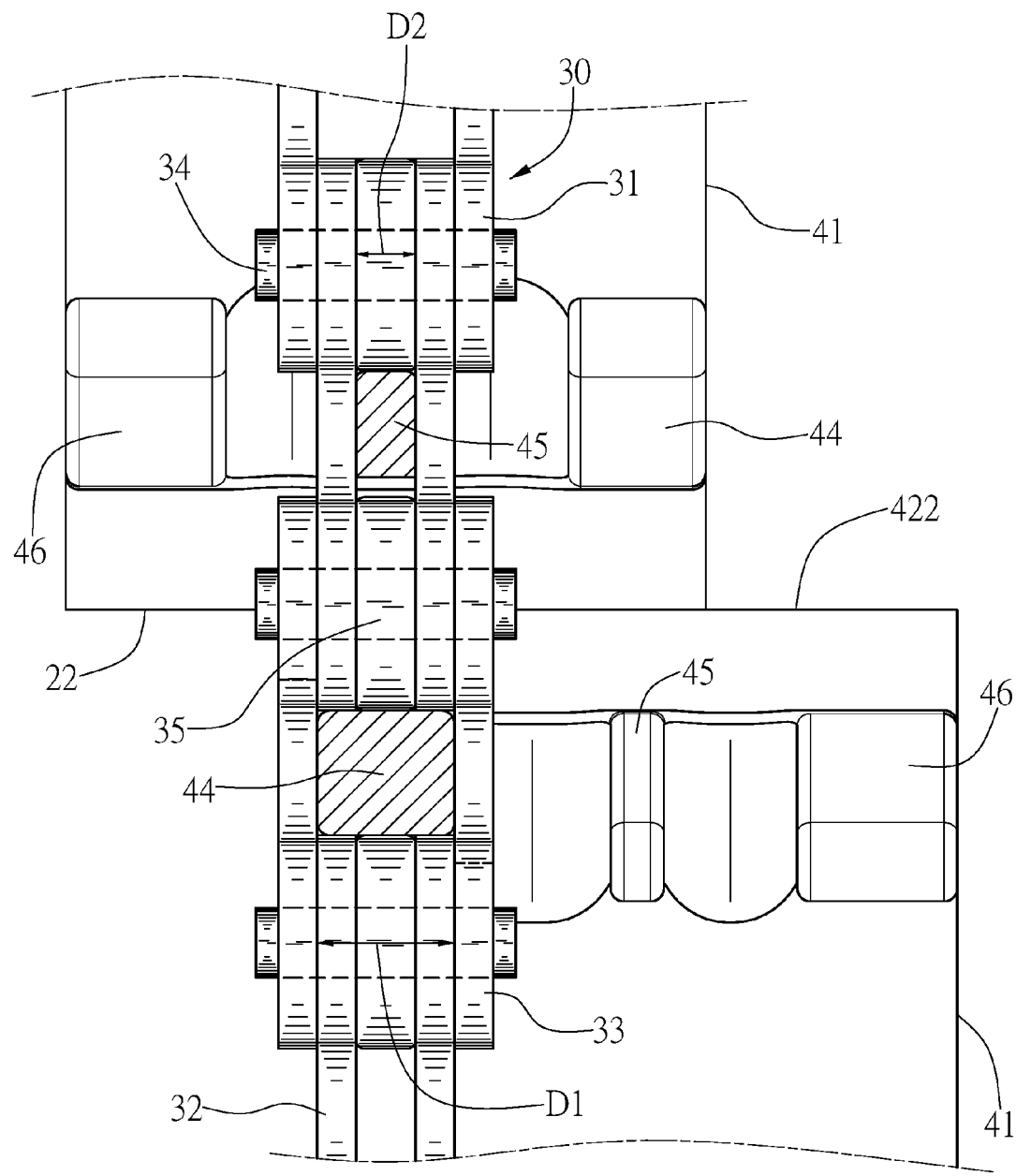
FIG. 13 shows how the two members in the second embodiment are used to connect a chain, with the first hook portion of one member and the second hook portion of the other member placed in the chain.

When the chain tool in the second embodiment is used to reconnect the chain 30, the two members 41 are arranged in a back-to-back configuration as shown in FIG. 12, with the first hook portion 44 and the second hook portion 45 of each member 41 facing away from their counterparts of the other member 41. Then, referring to FIG. 13, the first hook portion 44 of one member 41 is placed in between the pair of quick link plates 33 and is pressed against one of the two rollers 35 corresponding to the quick link plates 33, and the second hook portion 45 of the other member 41 is placed in between the pair of inner plates 32 located on one outer side of the quick link plates 33 and is pressed against another roller 35. The two members 41 in this state are not aligned in the width direction but are offset from each other, with the first hook portion 44 of one member 41 in alignment with the second hook portion 45 of the other member 41. In the meantime, the curved surfaces 422 of the two members 41 are pressed against each other. By applying a force to the two members 41, the two rollers 35 against which the two members 41 are respectively pressed will be moved away from each other so that the quick link plates 33 are firmly connected to one end link of the chain 30. The quick link plates 33 can be connected to the other end link of the chain 30 by a similar operation.

As stated above, during the connecting process of the chain 30, the first hook portion 44 of one member 41 is placed in between the pair of quick link plates 33 and pressed against one of the two rollers 35 corresponding to the quick link plates 33, and the second hook portion 45 of the other member 41 is placed in between the pair of inner plates 32 located on one outer side of the quick link plates 33 and pressed against another roller 35. As the first hook portion 44 and the second hook portion 45 in use are close to each other while connecting the chain 30, the lateral component force actually provided by the two members 41 to move the two rollers 35 away from each other is so large as to not only produce the same effect as the first embodiment, but also make it possible to generate a sufficiently large lateral component force by applying a relatively small force when trying to moving the two rollers 35 away from each other. Thus, the present invention saves time and effort during the connecting process of the chain 30.

Figure 14:
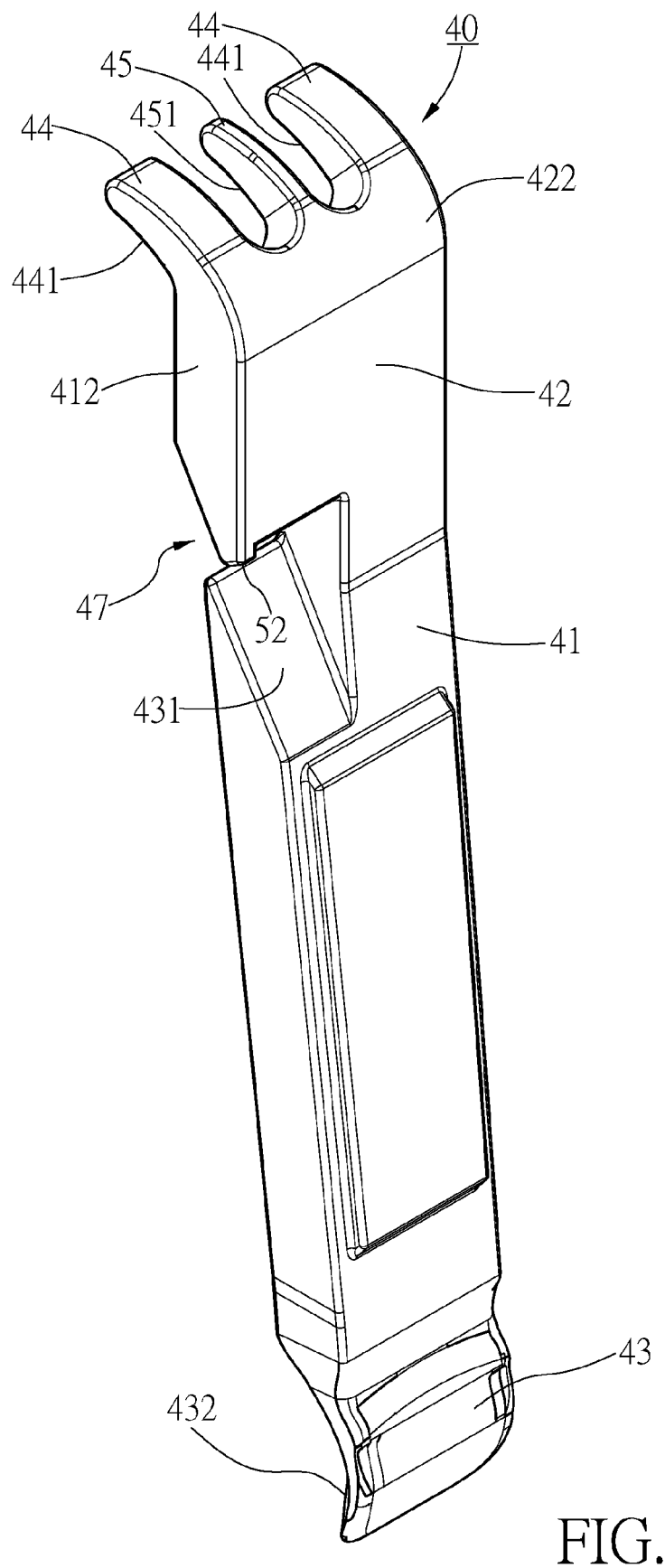
FIG. 14 is a perspective view of a member in the third embodiment of the present invention.
Figure 15:
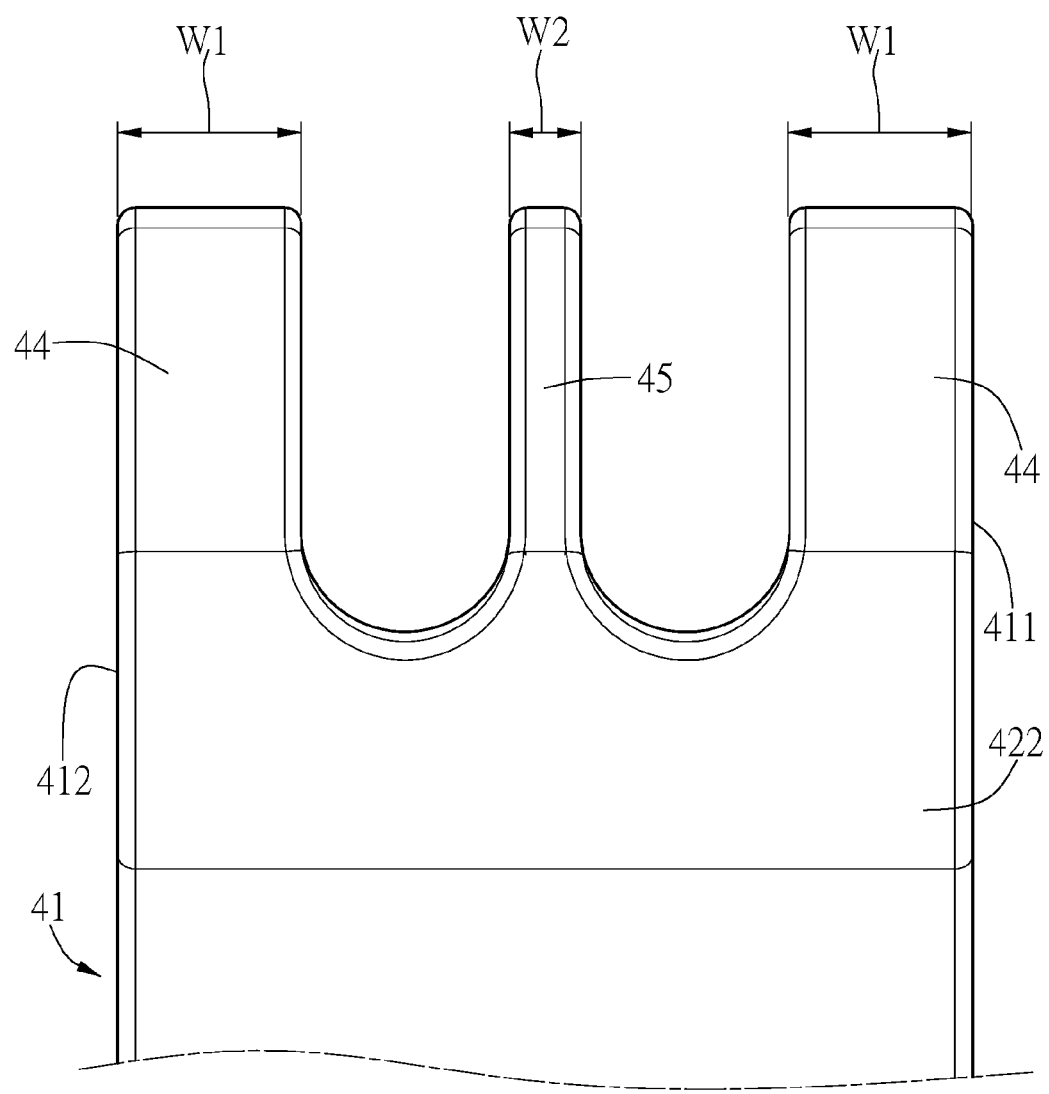
FIG. 15 is an enlarged view of the end of the member in FIG. 14 that has a plurality of hook portions.
Figure 16:
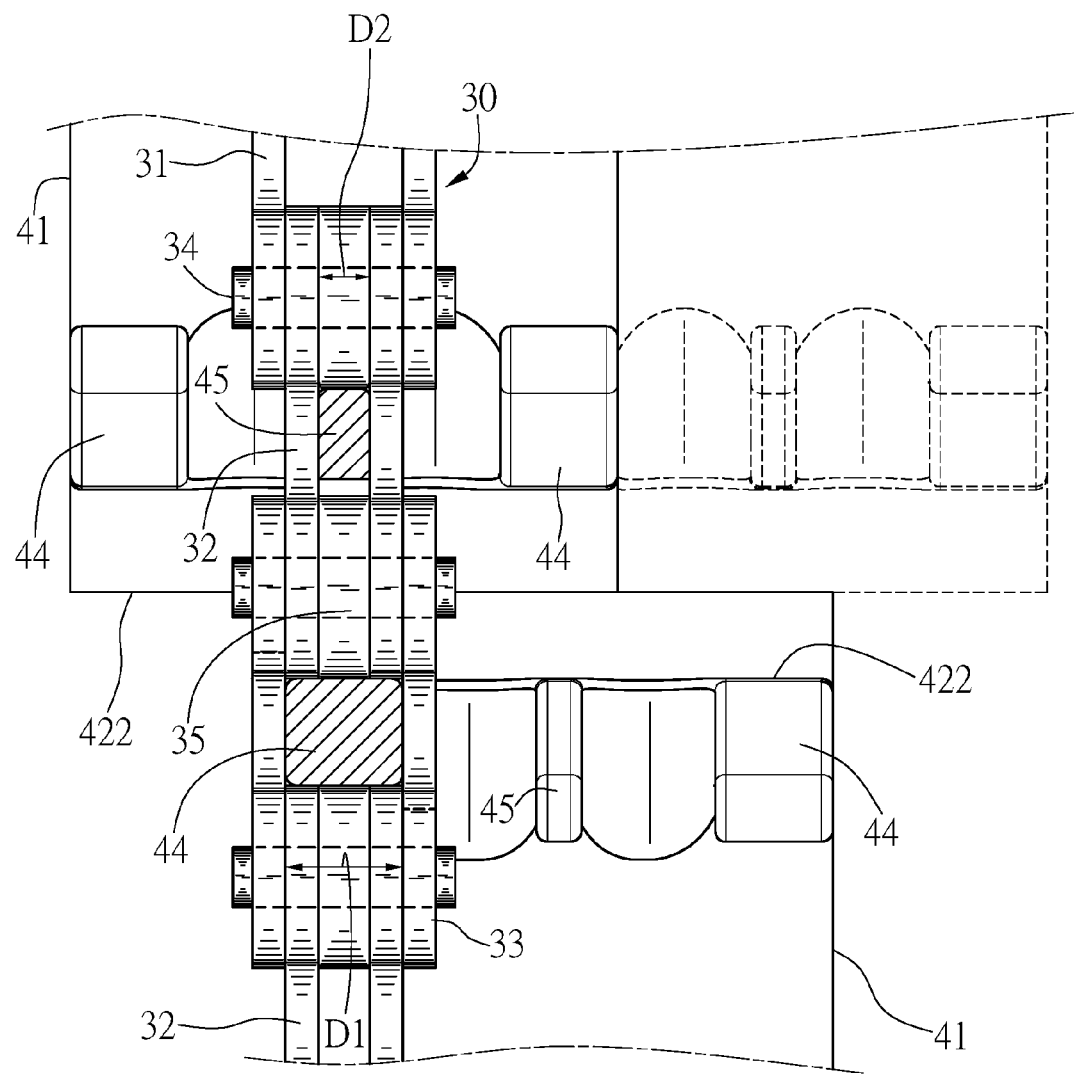
FIG. 16 shows how the two members in the third embodiment are used to connect a chain, with one of the first hook portions of one member and the second hook portion of the other member placed in the chain (the dotted-line portion showing the use of the other first hook portion of the former member)
Figure 17:
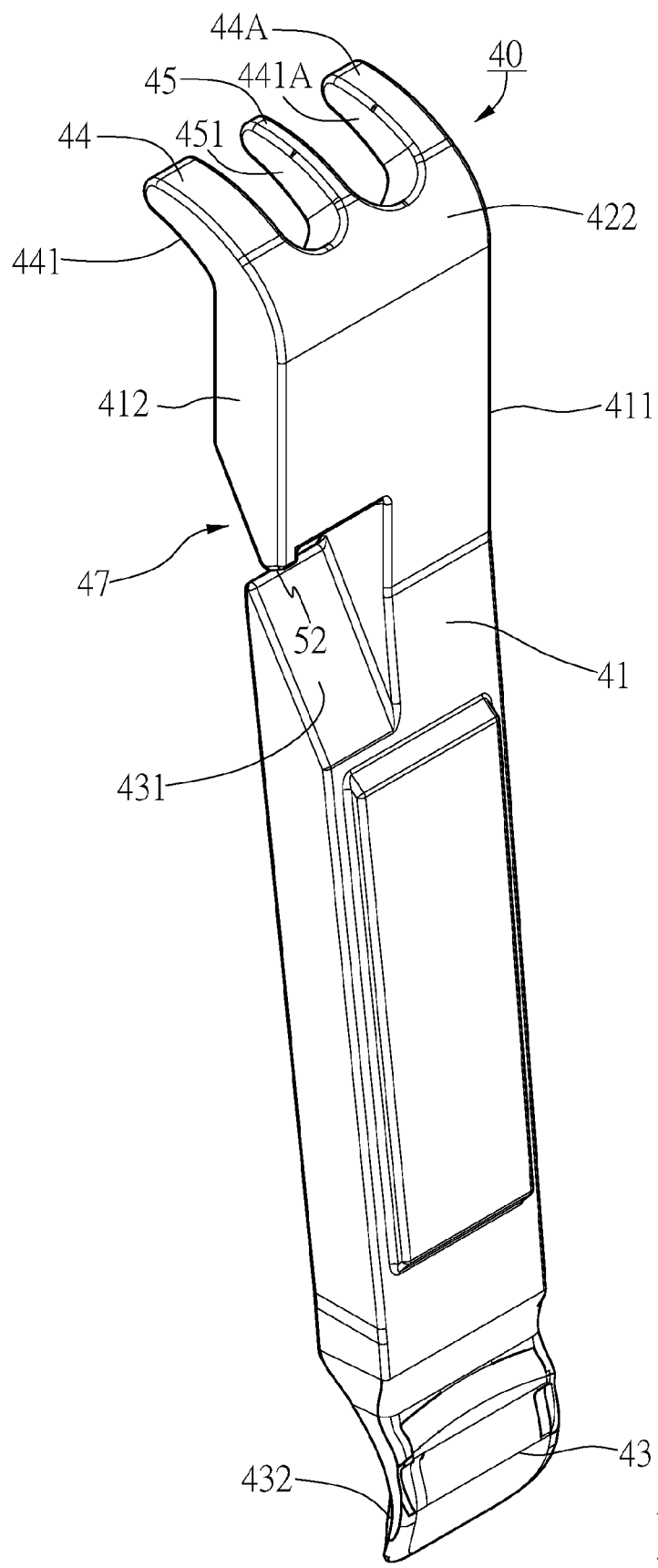
FIG. 17 is a perspective view of a member in the fourth embodiment of the present invention.
Figure 18:
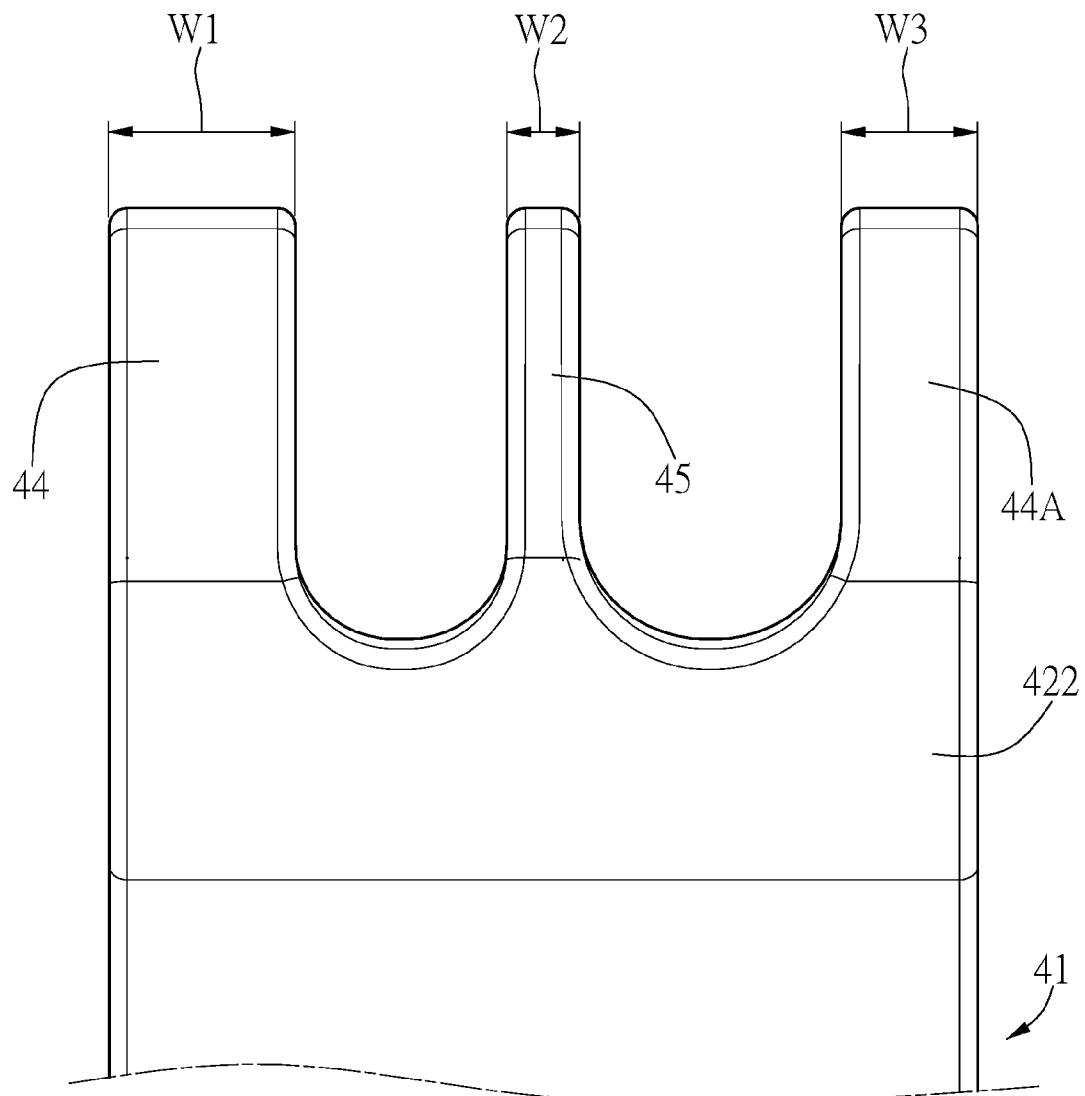
FIG. 18 is an enlarged view of the end of the member in FIG. 17 that has a plurality of hook portions.

FIG. 14 to FIG. 16 show the third embodiment of the present invention. The third embodiment is different from the previous one mainly in that each member 41 has two first hook portions 44 and one second hook portion 45, wherein the two first hook portions 44 have equal first widths W1 in order to be used with any chain 30 including a pair of quick link plates 33 that define the first distance D1 therebetween.

When the chain tool in this embodiment is used to connect the chain 30, the two members 41 are arranged in a back-to-back configuration as in the second embodiment, with the first hook portions 44 and the second hook portion 45 of each member 41 facing away from their counterparts of the other member 41. Then, as shown in FIG. 16, one of the first hook portions 44 of one member 41 is placed in between the pair of quick link plates 33 and pressed against one of the two rollers 35 corresponding to the quick link plates 33, and the second hook portion 45 of the other member 41 is placed in between the pair of inner plates 32 located on one outer side of the quick link plates 33 and pressed against another roller 35. As in the second embodiment, the two members 41 in this state are offset from each other, with one of the first hook portions 44 of one member 41 in alignment with the second hook portion 45 of the other member 41. Meanwhile, the curved surfaces 422 of the two members 41 are also pressed against each other. Therefore, by applying a force to the two members 41, the two rollers 35 against which the two members 41 are respectively pressed will be moved away from each other, too, allowing the chain 30 to be firmly connected.

In addition to producing the same effect as the first and second embodiments, the two first hook portions 44 of each member 41 in the third embodiment allow an operator to use either of the two first hook portions 44 of each member 41 (as shown separately in FIG. 16 by the solid-line portion and the dashed-line portion) when connecting the chain 30. This adds to the flexibility of tool operation.

Figure 19:
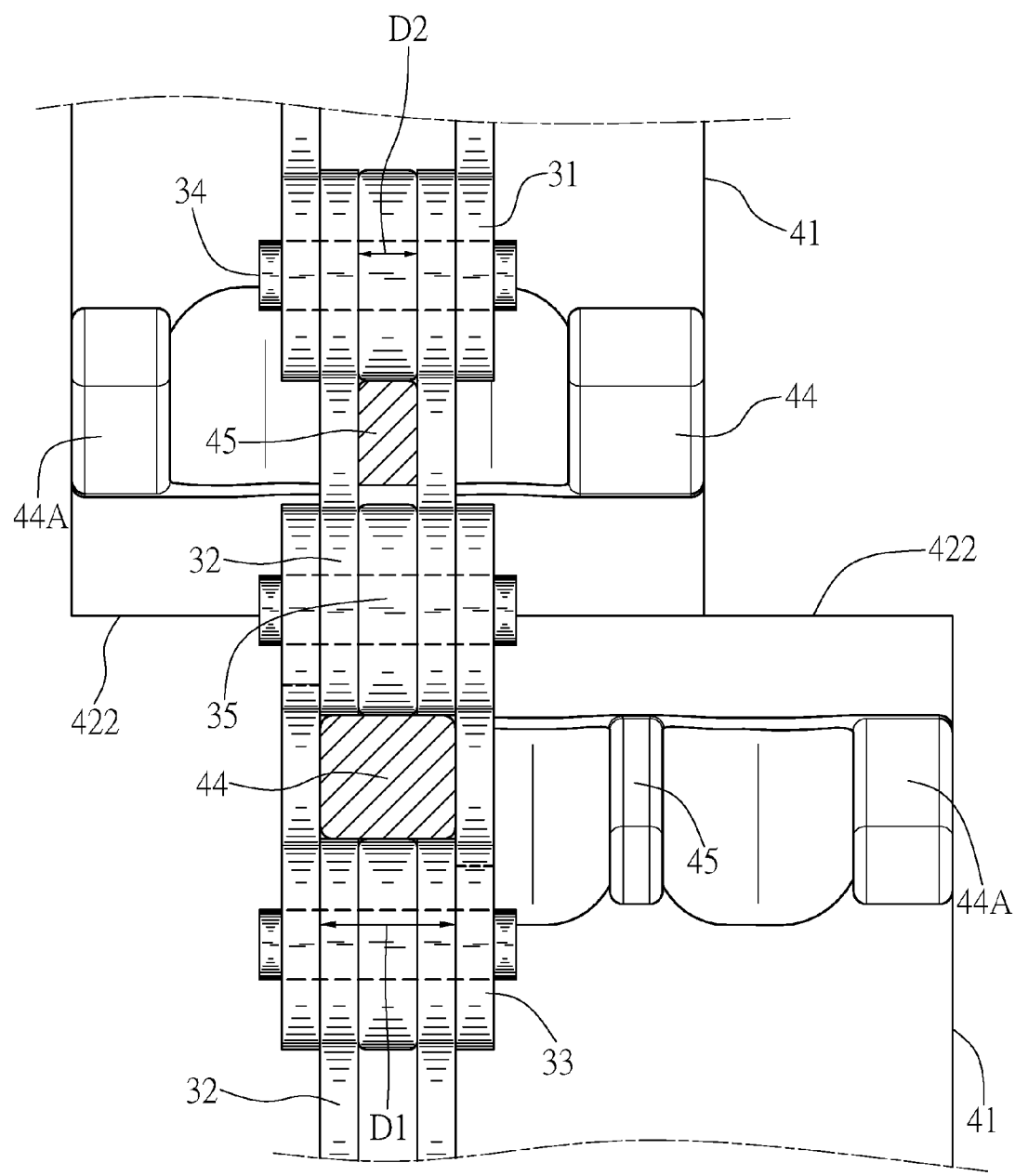
FIG. 19 shows how the two members in the fourth embodiment are used to connect a 9-speed chain, with the corresponding first hook portion of one member and the second hook portion of the other member placed in the chain.
Figure 20:
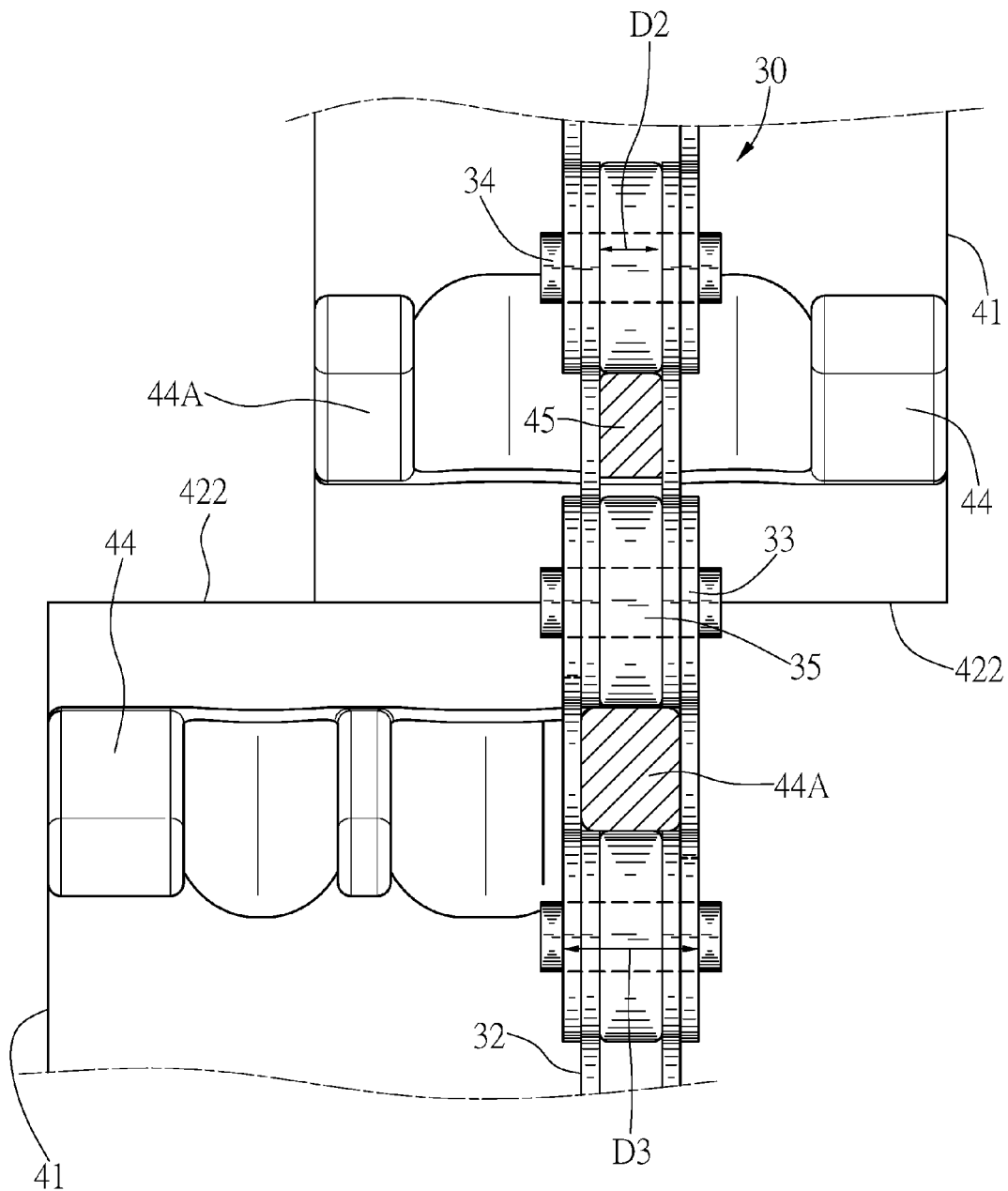
FIG. 20 shows how the two members in the fourth embodiment are used to connect an 11-speed chain, with the corresponding first hook portion of one member and the second hook portion of the other member placed in the chain.
Figure 21:
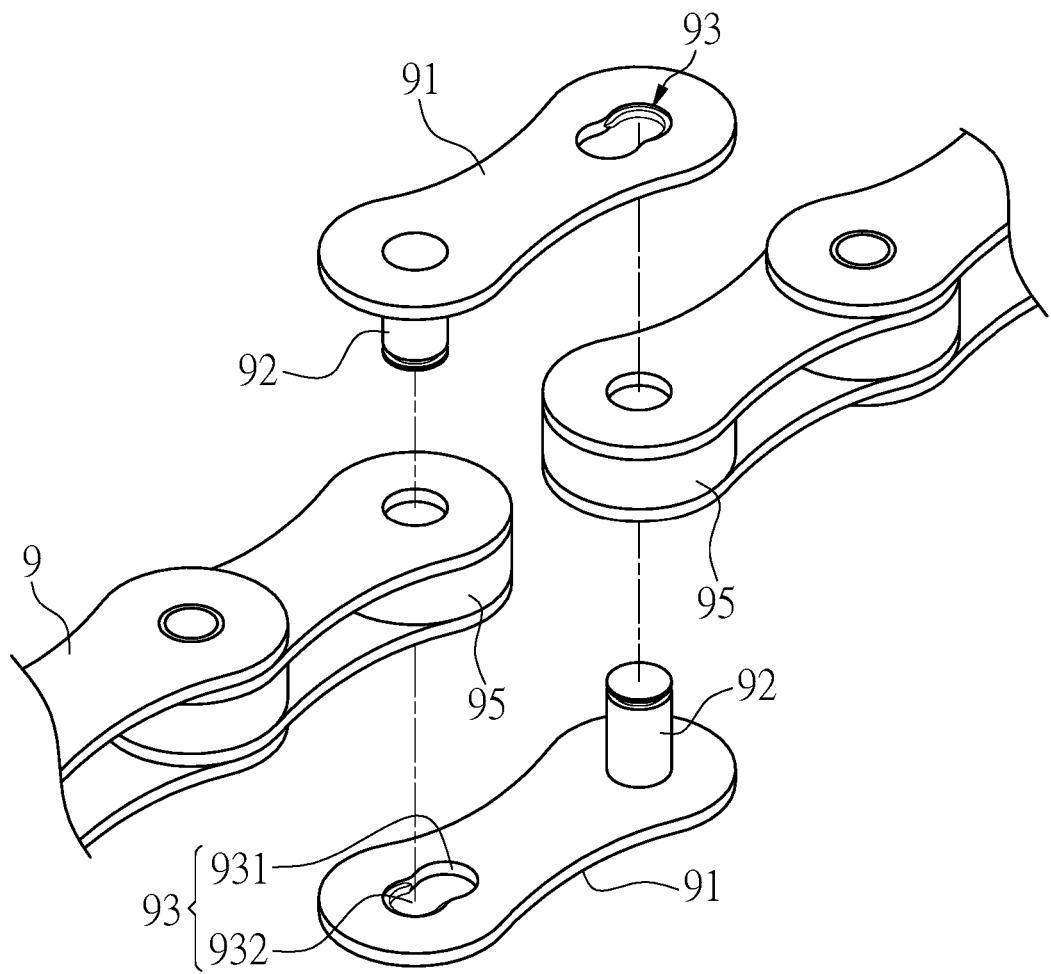
FIG. 21 is a perspective view showing how the two end links of a conventional rapidly connectable chain are connected to each other.
Figure 22:
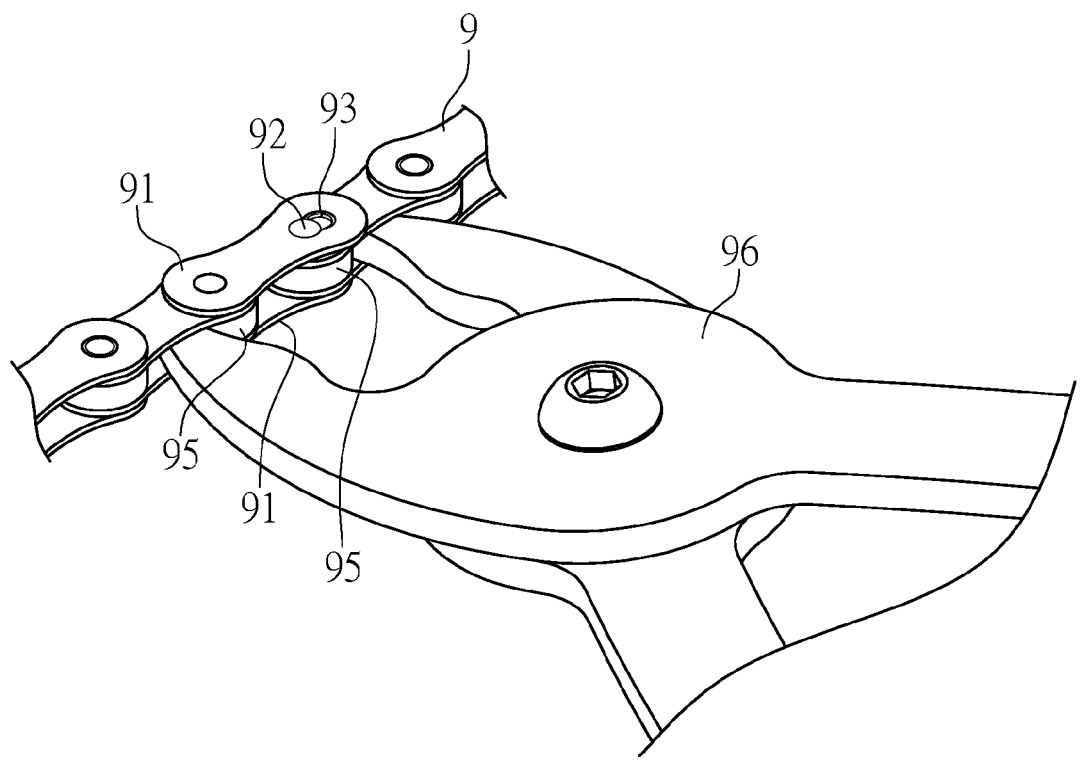
FIG. 22 is a perspective view showing how the chain in FIG. 21 is disconnected using a pair of pliers.

FIG. 17 to FIG. 20 show the fourth embodiment of the present invention. The fourth embodiment is different from the previous one mainly in that each member 41 has two first hook portions 44, 44A and one second hook portion 45, and that while the first hook portion 44 still has the first width W1, the first hook portion 44A is narrower than the first hook portion 44 and has a first width W3 in order to be used with a chain 30 including a pair of quick link plates 33 that define a different first distance D1 therebetween. As is well known in the art, the width of the chain 30 tends to vary with the design speed of the chain. For example, a high-speed chain generally has a smaller width than a low-speed chain. In this embodiment, in which the first hook portions 44 and 44A have different first widths, the first width W1 of the first hook portions 44 is suitable for a 9-speed chain 30 including a pair of quick link plates 33 that define the first distance D1 therebetween, as shown in FIG. 19, and the first width W3 of the first hook portions 44A is suitable for an 11-speed chain 30 including a pair of quick link plates 33 that define a first distance D3 therebetween, as shown in FIG. 20. Thus, the two members 41 can be used to disconnect and reconnect an 11-speed chain as well as a 9-speed chain, not only producing the same effect as the first and second embodiments, but also providing adaptability to chains of different specifications and hence more flexibility in operation.

What is claimed is:

1. A chain tool, applicable to a chain composed of plural pairs of outer plates, plural pairs of inner plates, and a pair of quick link plates sequentially connected by a plurality of pins, each said pin being provided with a roller, the chain tool having two members pivotally connectable to each other in a crossed configuration, wherein each said member comprises a first end and a second end opposite the first end, the first end of each said member is provided with a hook portion to be inserted in between the pair of quick link plates of the chain, and each said member has a first edge formed with an opening; the openings of the two members are engageable with each other so that the two members are pivotable with respect to each other about an axis defined by two engaged portions of the openings of the two members, wherein:

each said member has a second edge opposite the first edge of the each said member and concavely provided with a recess spaced apart from the opening of the each said member, each said member is transversely and concavely provided with a guide groove between and in communication with the opening and the recess of the each said member, the recess of each said member is slightly deeper than the guide groove of the each said member, and the first edge of each said member is provided with a rib extending along the first edge of the each said member and projecting into the opening of the each said member to form a protruding portion so that, when the openings of the two members are brought into engagement with each other, the protruding portion of each said member is moved along the guide groove of the other member into engagement in the recess of the other member.

2. The chain tool of claim 1, wherein the hook portion of each said member is curved toward one side of the each said member and is formed with an operating surface to be pressed into the pair of quick link plates, the first end of each said member is formed with two parallel spaced-apart grooves such that the hook portion of the each said member is formed between the two grooves, and two auxiliary hook portions are formed respectively on two lateral sides of the hook portion of each said member and curved in a same direction as the hook portion of the each said member.

3. The chain tool of claim 1, wherein each said member has a width defined as a distance between the first edge and the second edge of the each said member, and the opening of each said member has a width approximately equal to one half of the width of the each said member.

4. The chain tool of claim 1, wherein the first end of each said member has an end surface adjacent to one side of the opening of the each said member and formed with a first inclined guide surface, the second end of each said member has an end surface adjacent to an opposite side of the opening of the each said member and formed with a second inclined guide surface, and the first inclined guide surface and the second inclined guide surface of each said member are inclined, and extend, in a same direction.

5. The chain tool of claim 1, wherein the second end of each said member is extended with a scoop-like prying portion.

6. The chain tool of claim 1, wherein the second end of each said member extends in a direction defining a horizontal reference plane, and the first end of each said member extends in a direction inclined with respect to, and hence forming an included angle with, the second end of the each said member.

7. The chain tool of claim 6, wherein each said member has one said first hook portion, one said second hook portion, and an auxiliary hook portion arranged alongside the first hook portion and the second hook portion in order for the auxiliary hook portion, located beside the first hook portion or the second hook portion, to help secure the chain in position.

* * * * *